United States Patent Office

Re. 25,857
Reissued Sept. 14, 1965

25,857

WATER-INSOLUBLE BENZENEAZO-5-ACETO-ACETYLAMINOBENZIMIDAZOLONE DYESTUFFS

Karl Schilling, Frankfurt am Main, and Erich Dietz, Kelkheim, Taunus, Germany, assignors to Farbwerke Hoechst Aktiengesellschaft vormals Meister Lucius & Brüning, Frankfurt am Main, Germany, a corporation of Germany No Drawing. Original No. 3,109,842, dated Nov. 5, 1963, Ser. No. 222,955, Sept. 11, 1962. Application for reissue Dec. 29, 1964, Ser. No. 438,444
Claims priority, application Germany Sept. 14, 1961
6 Claims. (Cl. 260—157)

Matter enclosed in heavy brackets [ ] appears in the original patent but forms no part of this reissue specification; matter printed in italics indicates the additions made by reissue.

The present invention relates to novel water-insoluble azo-dyestuffs and to a process for preparing them; more particularly it relates to dyestuffs of the following general formula

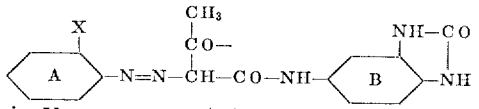

wherein X represents a halogen atom, a nitro, methyl, methoxy or trifluoromethyl group, the benzene nucleus A may be substituted by further groups which do not impart solubility in water and the benzene nucleus B may be substituted by methyl groups, methoxy groups or halogen atoms.

We have found that valuable water-insoluble monoazo-dyestuffs are obtained which possess a particularly good fastness to solvents and correspond to the general formula

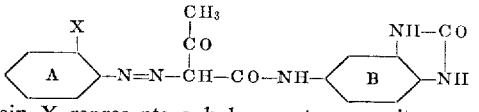

wherein X represents a halogen atom, a nitro, methyl, methoxy or trifluoromethyl group, the benzene nucleus A may be substituted by further groups which do not impart solubility in water and the benzene nucleus B may be substituted by methyl groups, methoxy groups or halogen atoms, by coupling the diazo compounds of amines of the benzene series which contain in ortho-position to the amino group a halogen atom or a nitro, methyl, methoxy or trifluoromethyl group and which may be substituted by further groups which do not impart solubility in water, with the acetoacetyl compounds of 5-amino-benzimidazolones which may be substituted in the benzene nucleus of the benzimidazolone radical by methyl groups, methoxy groups or halogen atoms.

As diazo components there are used in the process of the present invention amines of the benzene series having the above-mentioned composition, such as for example 1 - amino - 2 - nitrobenzene, 1 - amino-2-chlorobenzene, 1 - amino-2-methylbenzene, 1 - amino-2-methoxybenzene, 1-amino-2,5-dichlorobenzene, 1-amino-2-nitro-4-methoxybenzene, 1 - amino-2-nitro-4-chlorobenzene, 1 - amino-2-nitro - 4 - methylbenzene, 1-amino - 2 - chloro-5-trifluoromethylbenzene, 1-amino-2-chlorobenzene - 5 - carboxylic acid amide, 1-amino-2-chloro-4-methylbenzene, 1-amino-2-chloro-3-methylbenzene, 1-amino-2-bromo-4-nitrobenzene, 1 - amino-2-methyl-6-chlorobenzene, 1 - amino-2-methyl-3-chlorobenzene, 1 - amino-2-methyl-5-chlorobenzene or 1-amino-4-chloro-2-trifluoromethylbenzene. The amines are diazotized in the usual manner and coupled in a neutral, preferably in a weakly acid medium with the acetoacetyl compound of the 5-amino-benzimidazolone.

Instead of the acetoacetyl compound of the 5-amino-benzimidazolone there may be used the corresponding derivatives which may be substituted in the benzene nucleus of the benzimidazolone radical by methyl groups or methoxy groups or halogen atoms, such as for example 5 - acetoacetylamino-7-chloro - benzimidazolone, 5 - acetoacetylamino-7-bromo-benzimidazolone, 5 - acetoacetylamino-6-chloro - benzimidazolone, 5 - acetoacetylamino-6-methyl - benzimidazolone, 5-acetoacetylamino-7-methyl-benzimidazolone, 5-acetoacetylamino-7-methoxybenzimidazolone or 5 - acetoacetylamino-4,7 - dimethylbenzimidazolone.

The preparation of the pigments can be carried out in such a manner that the solution of the diazo compound is combined with the coupling component present in a weakly acid medium in a finely dispersed form or that the alkaline solution of the coupling component is added to the solution of the diazo component first introduced into the reaction vessel and adjusted to a pH-value of 5 to 6 by the addition of sodium acetate. A further possibility for carrying out the coupling is to add the solutions of the diazo and the coupling component simultaneously to a buffer mixture of sodium acetate and acetic acid. With all these working methods the presence of cationic, anionic or non-ionic surface-active compounds may be advantageous.

The dyestuffs obtained often possess a hard grain and have to be subjected to an after-treatment in order to obtain the full tinctorial strength. For this after-treatment it is expedient to use pyridine, dimethyl formamide, quinoline or N-methylacetamide at an elevated temperature. The dyestuffs may also be heated under pressure in the form of their aqueous pastes to temperatures above 100° C., preferably to 120° C. to 180° C., the addition of alcohols or other organic solvents facilitating the transformation of the dyestuff into a form exhibiting a high tinctorial strength. This transformation is sometimes successfully carried out by simply heating the dyestuffs in aqueous alcohols.

The novel pigments are suitable for the preparation of printing colors and for the preparation of color lakes. They can also be used for dyeing rubber and plastics, especially polyvinylchloride. As compared with known monoazo-dyestuffs of the acetoacetic anilide series not derived from acetoacetyl compounds of the 5-amino-benzimidazolones, the novel pigments are distinguished in addition to a very good fastness to light by an improved fastness to solvents. That is to say the novel pigments possess all the properties imparted by the improved fastness to solvents, such as fastness to oil, to overspraying, to overvarnishing, to blooming and to bleeding.

The following examples serve to illustrate the invention, but they do not intend to limit it thereto, the parts being by weight unless otherwise stated and the relationship of parts by weight to parts by volume being the same as that of the kilogram to the liter.

EXAMPLE 1

86.5 parts of 1-amino - 2 - nitro - 4 - chlorobenzene are stirred for several hours, advantageously over night, with 400 parts by volume of 5 N-hydrochloric acid. Then 200 parts of ice are added to the suspension and the mixture is diazotized by introducing under its surface within about 2 hours 100 parts by volume of a 5 N-sodium nitrite solution, while vigorously stirring. By the occasional addition of ice the temperature is maintained below 5° C. When the diazotization is complete the diazo solution is clarified by adding a small quantity of kieselguhr and, a minor excess of nitrous acid is removed by means of a small amount of amido sulfonic acid.

While quickly stirring, the diazo solution is introduced into an acetic suspension of the coupling component which has been obtained in the following manner:

120 parts of 5-acetoacetylamino-benzimidazolone are dissolved at normal temperature in 600 parts by volume of 2 N-sodium hydroxide solution. The solution is made up to 3000 parts by volume by adding water, then 1000 parts by volume of 2 N-sodium acetate solution are added to the solution, while vigorously stirring, 700 parts by volume of 2 N-acetic acid are added to the solution and the temperature is adjusted to 20° C. by adding ice.

The coupling is immediately complete. The mixture is after-stirred for 2 hours, the black brown dyestuff is filtered off with suction and washed thoroughly with water. The thoroughly expressed filter residue is stirred with 1000 parts by volume of pyridine to yield a homogeneous paste. The mixture is heated at the boil for 1 hour under reflux, while stirring, whereby the dark brown dyestuff is transformed into an orange red product. The pyridine is removed by distillation with steam, the dyestuff is filtered off with suction and dried at 60° C.

210 parts of an orange pigment possessing a high tinctorial strength and a soft grain and distinguished by a good fastness to light, a very good fastness to solvents and a very good fastness to bleeding in polyvinyl chloride are obtained.

EXAMPLE 2

86.5 parts of 1-amino-2-nitro-4-chlorobenzene are diazotized and coupled with 120 parts of 5-acetoacetylamino-benzimidazolone as described in Example 1. The coupling mixture is heated to 60° C. by introducing steam, the dark brown dyestuff is filtered off with suction, washed with water and thoroughly squeezed off. The filter residue (about 1700 parts) is stirred with a solution of 15 parts of oleylamine acetate in 600 parts by volume of water, with 125 parts by volume of 2 N-acetic acid and with 600 parts by volume of alcohol to yield a homogeneous paste. Then the mixture is heated at the boil for 7 to 8 hours while stirring and cooling under reflux, whereby the brown dyestuff is gradually transformed into an orange red product; the mixture is diluted with hot water to double its volume and subjected for 1 hour to a distillation with steam. The dyestuff is filtered off with suction and dried at 60° C.

There are obtained 200 parts of an orange pigment possessing a high tinctorial strength and a soft grain and the same excellent fastness properties as the dyestuff described in Example 1.

EXAMPLE 3

17.5 parts of 1-amino-2-nitro-4-chlorobenzene are diazotized as described in Example 1 and coupled at 20° C. and at a pH-value of 4 with the acetic suspension of 24 parts of 5-acetoacetylamino-benzimidazolone. The mixture is after-stirred for 2 hours, the black brown dyestuff is filtered off with suction, thoroughly washed with water and dried at 60° C. 40 parts of a dark, almost black dyestuff possessing a low tinctorial strength and a hard grain are obtained.

The finely pulverized dyestuff is then stirred for 4 hours at normal temperature with 400 parts by volume of pyridine, whereby the initially dilute suspension gradually thickens. The dyestuff is filtered off with suction, washed first with a small amount of pyridine, then thoroughly washed with water and dried at 60° C.

There are obtained 38 parts of a brown pigment possessing a soft grain and a high tinctorial strength and distinguished by a very good fastness to light and a very good fastness to solvents as well as a very good fastness to bleeding in polyvinyl chloride. This dyestuff is a structurally isomeric form of the product described in Examples 1 and 2. Though the dyestuffs have the same chemical composition, they show different X-ray spectra.

EXAMPLE 4

17 parts of 3-amino-4-chloro-benzamide are dissolved in 200 parts by volume of 2 N-hydrochloric acid. The solution is cooled to 5° C. by the addition of ice and diazotized with 50 parts by volume of 2 N-sodium nitrite solution. The diazo solution is made up to 500 parts by volume by adding ice water.

Furthermore, 24 parts of 5-acetoacetylamino-benzimidazolone are dissolved at normal temperature in 150 parts by volume of 2 N-sodium hydroxide solution. The solution is made up to 500 parts by volume by adding water.

Both solutions are introduced simultaneously, while vigorously stirring, into a buffer solution of a pH-value of 5 containing 50 parts by volume of 2 N-acetic acid, 200 parts by volume of 2 N-sodium acetate solution and 200 parts by volume of water. When the introduction is terminated, the coupling is also complete. The mixture is heated to 90° C. by introducing steam, the yellow dyestuff is filtered off with suction and washed thoroughly with water.

The thoroughly expressed moist dyestuff is then stirred with 200 parts by volume of pyridine to yield a homogenous paste which, while stirring, is heated at the boil for 1 hour under reflux. Subsequently the pyridine is distilled off with steam. The dyestuff is filtered off with suction and dried at 60° C. 40 parts of a yellow pigment possessing a soft grain and a high tinctorial strength and a very good fastness to solvents and to light are obtained.

EXAMPLE 5

14.2 parts of 1-amino-2-methyl-4-chlorobenzene are diazotized at temperatures below 10° C. in known manner with 200 parts by volume of 2 N-hydrochloric acid and 50 parts by volume of 2 N-sodium nitrite solution. The diazo solution which, if desired, has been clarified and freed from the nitrous acid in excess is made up to 500 parts by volume by adding ice water.

Furthermore, 24 parts of 5-acetoacetylamino-benzimidazolone are dissolved in 150 parts by volume of 2 N-sodium hydroxide solution. The solution is also made up to 500 parts by volume by adding water.

Both solutions are introduced simultaneously, while quickly stirring, into a buffer solution of 50 parts by volume of 2 N-acetic acid, 200 parts by volume of 2 N-sodium nitrite solution and 100 parts by volume of water. The coupling is soon complete. The dyestuff is filtered off with suction, thoroughly washed with water and dried at 60° C. There are obtained 42 parts of a yellow pigment possessing a low tinctorial strength which is finely pulverized and stirred at normal temperature for 2 hours with 350 parts by volume of pyridine, whereby the initially dilute suspension thickens considerably. The mixture is then heated for 1 hour to 50° C., diluted with the same volume of warm water, the dyestuff is filtered off with suction, washed with hot water and dried at 60° C.

36 parts of a yellow pigment possessing a soft grain and a high tinctorial strength and a good to very good fastness to solvents and a very good fast to light are obtained.

EXAMPLE 6

15 parts of 3-amino-4-methyl-benzamide are diazotized in known manner at temperatures below 10° C. with 200 parts by volume of 2 N-hydrochloric acid and 50 parts by volume of a 2 N-sodium nitrite solution. 200 parts by volume of 2 N-sodium acetate solution are added to the diazo solution. Into this solution there is introduced within ½ hour, while vigorously stirring, a solution of 14 parts of 5-acetoacetylamino-7-chlorobenzimidazolone in 120 parts by volume of a 2 N-sodium hydroxide solution, to which 10 parts by volume of a 10% solution of an emulsifier obtained by the reaction of oleyl alcohol with 30 mols of ethylene oxide have been added and which is made up to 1000 parts by volume by the addition of water. About ½ hour after the mixing of the components, the coupling is complete. At the end of the coupling operation the temperature is 20° C. and the pH-value about 5. The mixture is after-stirred for 2 hours, heated to 60° C. by introducing steam, the dyestuff is filtered off with suction, thoroughly washed and dried at 60° C.

45 parts of a yellow pigment possessing a hard grain and a low tinctorial strength are obtained. When the finely pulverized dyestuff is stirred for 4 hours at 50° C. with 400 parts by volume of pyridine, the dyestuff is filtered off with suction and the residual pyridine is distilled off with steam, there are obtained after another filtering off with suction and drying 41 parts of a yellow pigment possessing a soft grain and a high tinctorial strength and distinguished by a very good fastness to solvents, a very good fastness to light and an unobjectionable fastness to bleeding in polyvinyl chloride.

In the following table further components are listed which can be used in the process of the invention, and also the tints of the monoazo-dyestuffs prepared from these components.

| | Diazo component | Coupling component | Tint |
|---|---|---|---|
| 1 | 1-amino-2-nitrobenzene | 5-acetoacetylamino-benzimidazolone. | reddish yellow. |
| 2 | 1-amino-2-chlorobenzene | do | yellow. |
| 3 | 1-amino-2-methylbenzene. | do | Do. |
| 4 | 1-amino-2-methoxybenzene. | do | Do. |
| 5 | 1-amino-2-nitro-4-methoxybenzene. | do | reddish yellow. |
| 6 | 1-amino-2-nitro-4-methylbenzene. | do | yellow. |
| 7 | 1-amino-2-chloro-5-trifluoromethyl-benzene. | do | brownish yellow. |
| 8 | 1-amino-2-chloro-4-methylbenzene. | do | reddish yellow. |
| 9 | 1-amino-2-chloro-3-methylbenzene. | do | yellow. |
| 10 | 1-amino-2-methyl-6-chlorobenzene. | do | Do. |
| 11 | 1-amino-2-methyl-3-chlorobenzene. | do | reddish yellow. |
| 12 | 1-amino-2-methyl-5-chlorobenzene. | do | Do. |
| 13 | 1-amino-2-nitrobenzene | 5-acetoacetylamino-7-chloro-benzimidazolone. | yellow. |
| 14 | 1-amino-2-chlorobenzene | do | greenish yellow. |
| 15 | 1-amino-2-nitro-4-chlorobenzene. | do | brownish yellow. |
| 16 | 1-amino-2-nitro-4-methylbenzene. | do | reddish yellow. |
| 17 | 1-amino-2-nitro-4-methoxybenzene. | do | orange red. |
| 18 | 1-amino-2-chlorobenzene-5-carboxylic acid amide. | do | greenish yellow. |
| 19 | 1-amino-2-methyl-5-chlorobenzene. | do | Do. |
| 20 | 1-amino-2-nitro-4-chlorobenzene. | 5-acetoacetylamino-7-methyl-benzimidazolone. | brown. M |
| 21 | 1-amino-2-chlorobenzene-5-carboxylic acid amide. | do | reddish yellow. |
| 22 | 1-amino-2-nitro-4-methoxybenzene. | 5-acetoacetylamino-6-chloro-benzimidazolone. | yellow orange. |
| 23 | 1-amino-2-nitro-4-chlorobenzene. | do | reddish yellow. |
| 24 | 1-amino-2-nitro-4-methylbenzene. | do | yellow orange. |
| 25 | 1-amino-2-chlorobenzene | 5-acetoacetylamino-6-methyl-benzimidazolone. | yellow. |
| 26 | 1-amino-2-chlorobenzene-5-carboxylic acid amide. | 5-acetoacetylamino-7-methoxy-benzimidazolone. | brownish yellow. |
| 27 | 1-amino-2-nitro-4-methoxybenzene. | 5-acetoacetylamino-7-bromo-benzimidazolone. | orange. red |

| | Diazo component | Coupling component | Tint |
|---|---|---|---|
| 28 | 1-amino-4-chloro-2-trifluoromethylbenzene. | do | greenish yellow. |
| 29 | 1-amino-2-methylbenzene-5-carboxylic acid amide. | 5-acetoacteylamino-benzimidazolone. | Do. |
| 30 | 1-amino-2-methyl-5-nitrobenzene. | 5-acetoacetylamino-benzimidazolone. | yellow. |
| 31 | 1-amino-2-methoxy-4-nitrobenzene. | do | Do. |
| 32 | 1-amino-2-methoxy-5-nitrobenzene. | do | Do. |
| 33 | 1-amino-2-methoxybenzene-5-carboxylic acid anilide. | do | reddish yellow. |
| 34 | 1-amino-2-methylbenzene-5-carboxylic acid anilide. | do | yellow. |
| 35 | 1-amino-2-methylbenzene-5-carboxylic acid methylamide. | do | Do. |
| 36 | 1-amino-2-methoxybenzene-5-carboxylic acid amide. | do | reddish yellow. |

We claim:

1. The water insoluble monoazo-dyestuffs having the formula

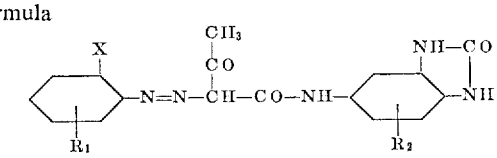

wherein X represents a member of the group consisting of chlorine, methyl, methoxy, nitro and trifluoromethyl, $R_1$ represents a member of the group consisting of *hydrogen*, chlorine, methyl, methoxy, nitro, carboxylic acid amide, carboxylic acid-N-methyl amide, carboxylic acid-N-phenylamide and trifluoromethyl, and $R_2$ represents a member of the group consisting of *hydrogen*, chlorine, bromine, methyl and methoxy.

2. The water-insoluble monoazo-dyestuff having the formula

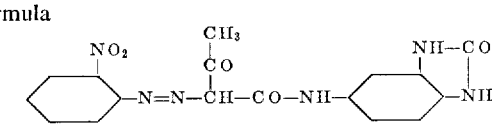

3. The water-insoluble monoazo-dyestuff having the formula

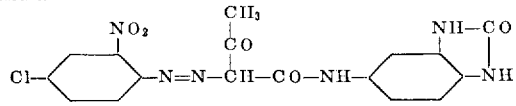

4. The water-insoluble monoazo-dyestuff having the formula

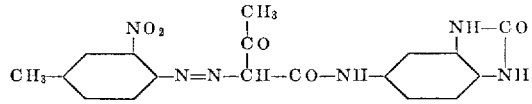

5. The water-insoluble monoazo-dyestuff having the formula

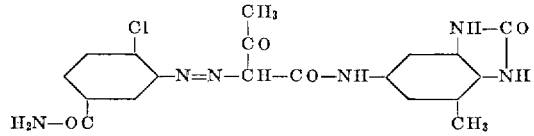

6. The water-insoluble monoazo-dyestuff having the formula

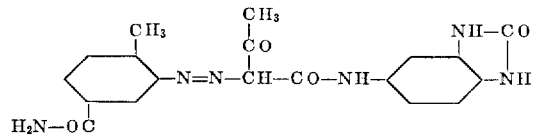

No references cited.

CHARLES B. PARKER, *Primary Examiner.*